INVENTOR.
WARREN W. DRUMMOND
BY
*Oscar H. Spencer*
ATTORNEY

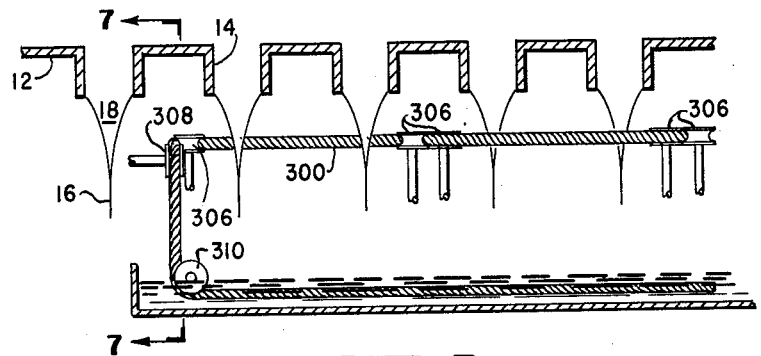
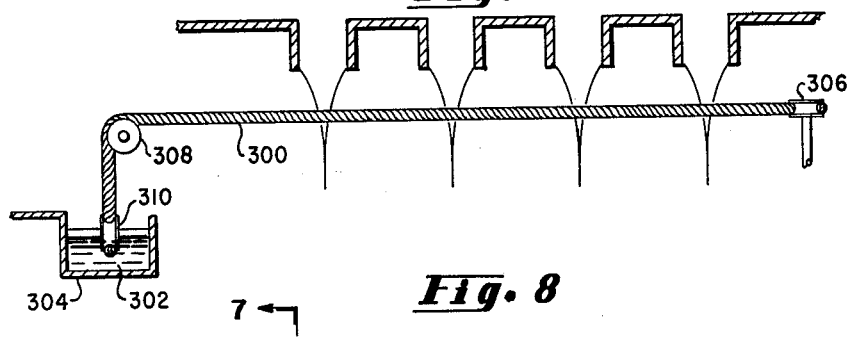
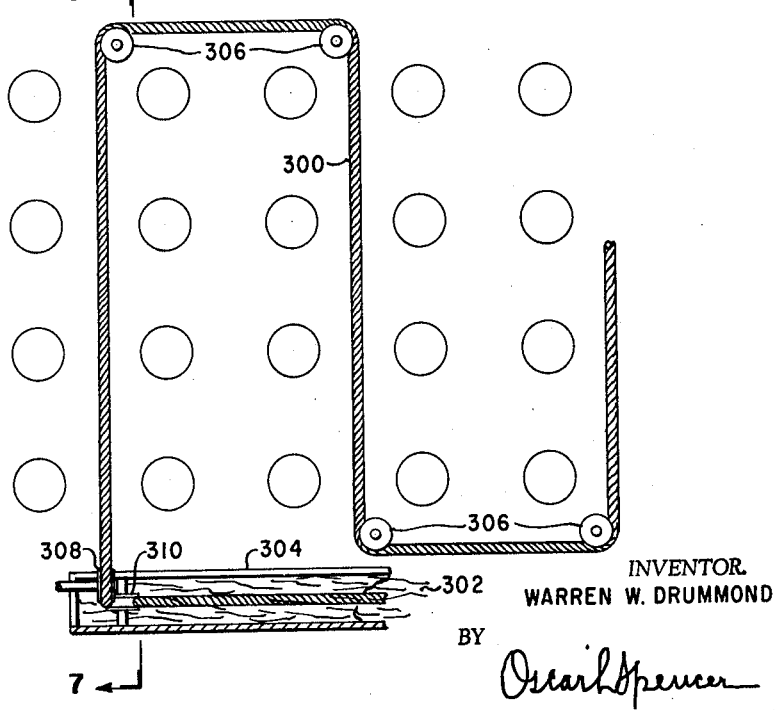

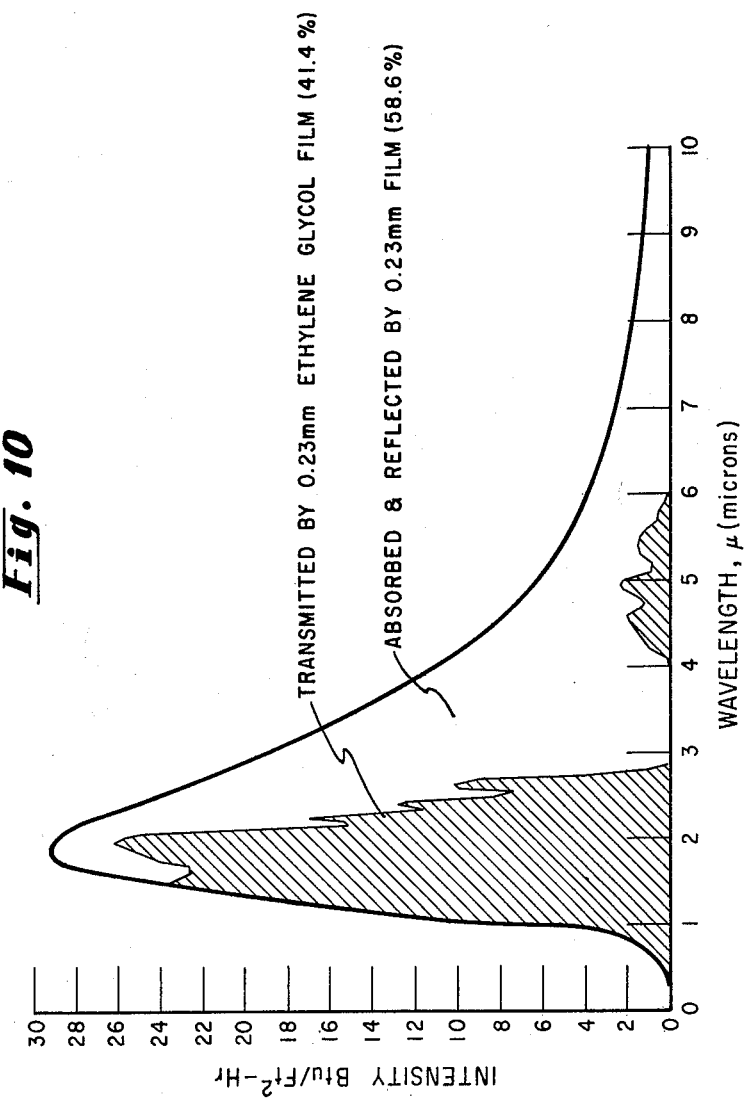

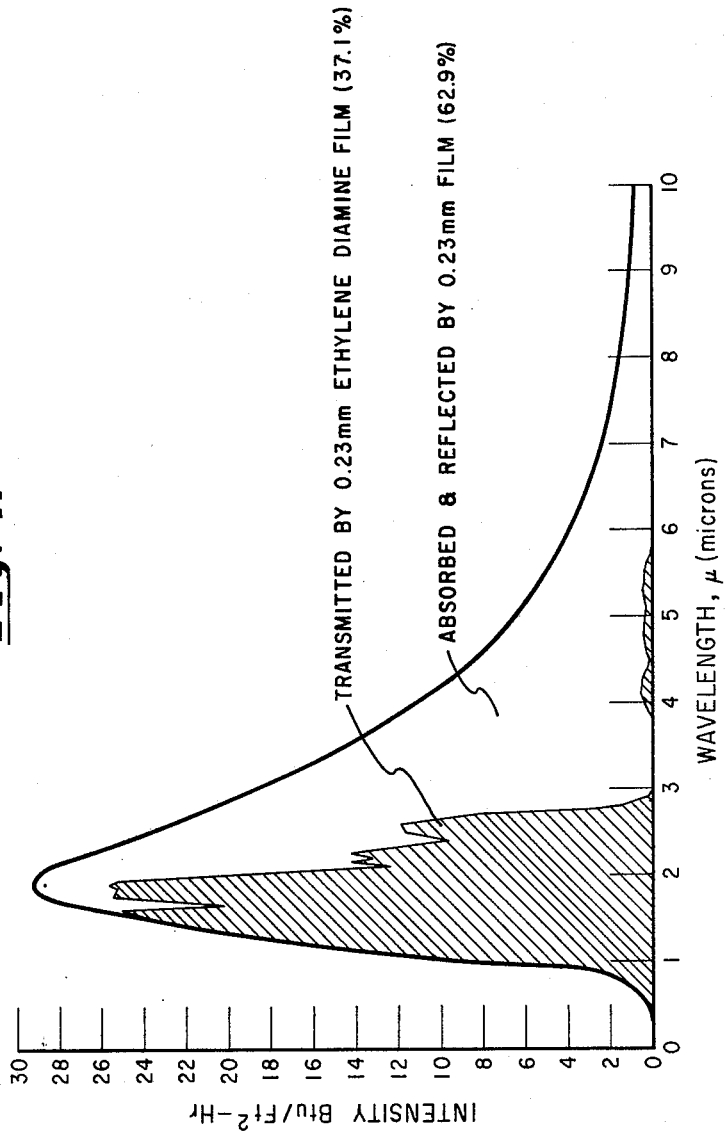

United States Patent Office 3,155,476
Patented Nov. 3, 1964

3,155,476
APPARATUS FOR PRODUCING GLASS FIBERS
Warren W. Drummond, Allison Park, Pa., assignor to Pittsburgh Plate Glass Company, Pittsburgh, Pa., a corporation of Pennsylvania
Filed Jan. 17, 1962, Ser. No. 166,834
4 Claims. (Cl. 65—12)

This invention relates to improvements in the production of fibers from heat softenable materials and, in particular, to improvements in the apparatus for continuously producing fibers of siliceous materials, such as glass or the like. The invention is described and illustrated particularly with respect to the production of continuous glass fibers wherein the fibers are mechanically drawn from a heated bushing having orifices therein through which the glass issues as small diameter streams and is then attenuated to relatively small diameter fibers gathered into a strand and wound on a package. Such fibers are converted into other textile forms, such as yarn or roving as is well known in the art today. The invention, however, is not limited to continuous type fiber producing apparatus but is also applicable to the production of staple fibers as shown in United States Patent No. 2,489,243.

The process of producing continuous fibers of glass includes flowing streams of molten glass from the orifices of heated bushings associated with a reservoir of molten glass, such as glass melting tank. There may be 100 or more orifices in a bushing which is constructed of a platinum-rhodium alloy. The streams of glass flowing from the orifices, which may be in the form of projecting tips or the like, neck down and form cones of glass. The temperatures of the glass in the bushing and also in the cone area are important in order to draw fibers of great homogeneity at a high rate of speed, such as 10,000 to 20,000 feet per minute or more.

It is advantageous to heat the glass in the bushing to a relatively high temperature so as to produce fibers of great homogeneity. However, because of the relative locations of the bushing, which is heated and generally not insulated at its bottom, and the cones of glass from which the fibers are drawn, heat is radiated from the bushings to the cones of glass. The temperature of the glass in the cones is raised, so that the viscosity of the glass in the cone is lowered. At a relatively low viscosity the glass in the cones form beads or droplets instead of flowing as continuous streams of glass. It thus becomes difficult to produce fibers under these conditions.

It is well known to provide means for extracting heat energy from the cones of glass from which the fibers are drawn. Examples of such teachings are to be found in the Russell United States Patents Nos. Reissue 24,060 and 2,908,036. In the reissue patent the heat energy extracting means includes a water jacket having openings in alignment with the orifices through which glass flows as streams. When using such an apparatus the observation of the operation is difficult. Also, the apparatus is expensive to manufacture and maintain. There is no assurance that the apparatus will not deteriorate because of the intense heat encounter which is on the order of 2200° F. This is true because the surface of the heat energy extracting means is not protected in any way whatsoever. The Russell Patent No. 2,908,036 shows cooled fin shields. These also serve to extract heat from the area of the cones of glass issuing from the orifices of the bushings. However, the useful life of such shields is limited because no protection is afforded its surfaces from the intense heat encountered, as on the order of 2200° F. In addition, the use of the fin shields fails to introduce a condition of stability in the fiber producing process. Initially, the shields which are generally constructed of silver or silver alloy have a somewhat shiny and reflective surface finish. With such a surface finish, the fins actually reflect heat radiated from the cones of glass back to the cones of glass or away from the bushing area. The surface finish and condition of the fin continually change, so that after a few hours of operation a different heat transfer condition is established. Continued use of the fins results in a continual change of fin surface finish and condition and a resultant continued change in heat transfer from the cones of glass to the fins. After approximately one week of operation, the fins are so encrusted on their surface that they must be replaced. The cycle of operation is repeated. This replacement and the continual change in fin condition requires continual bushing temperature adjustments in order to maintain uniform fiber diameter control. Also, because of the construction of the fin shields, that is, cooled at one end only by conductive heat transfer by water flowing through a supporting header, there is no assurance that heat will be extracted from the cones uniformly. This causes different fiber diameters from side-to-side from the bushing, an important consideration as the number of tips is increased.

According to the present invention, which overcomes the drawbacks of the prior art as will be clearly obvious, means are provided for directly and uniformly absorbing heat energy radiated from the cones of glass issuing from the bushing orifices. In addition and contrary to what might be expected, less cooling fluid is used for the same cooling effect with the present invention than with the prior art devices set out above, indicating a more efficient use of cooling fluid and more efficient arrangement for cone temperature conditioning.

The cones of glass issuing from the bushing tips are at a temperature of approximately 2200° F. Because the emissivity of glass, that is, 0.94, is nearly that of a black body, coupled with the fact that the glass is flowing from a small orifice, black body source radiation is very nearly realized. The wave length of the radiant energy emitted by the cones of glass is distributed primarily in the range of one-half micron to 10 microns which is in the infra-red spectrum.

Heat energy, as is well known, may be transferred by conduction, convection, and by radiation. To extract heat from the cones of glass rapidly, it has been found that heat transfer by radiation is of prime importance.

The invention to be described takes advantage of the property of certain liquids, such as water, to absorb a large percentage of incident radiant heat energy in the infra-red spectrum. This principle is applied to the absorption of heat energy radiated by the cones of glass flowing from a bushing during the production of glass fibers. The liquid, in addition to absorbing the radiant energy, protects a liquid supporting surface from deterioration because of the heat and atmosphere encountered. The stability of fiber formation is initially enhanced and continued stability of the operation is assured because of substantially uniformity of heat energy extraction and maintenance of surface condition of the supporting surfaces when using the present invention.

To accomplish the above objectives, a liquid, such as water, which absorbs at least 50 percent of infra-red radiant energy having a wavelength distribution of ½ to 10 microns is passed transverse to and adjacent to but spaced from the bushing and the orifices. The liquid is preferably passed at least between alternate rows of the bushing orifices. It may be passed from the ends to the center of the bushing or from side-to-side of the bushing so as to subdivide the orifice tips into orderly rows of at least a pair of tips in width. The actual arrangement depends upon bushing design. The liquid is guided along a specific path and is supported with a surface thereof exposed to the atmosphere adjacent the cones of glass and the bushing, so as to be in radiant heat transfer relationship with the cones of glass.

The support-guide for the liquid may vary in construction. For example, a series of parallel troughs may be used. These are preferably positioned and located between the lower extremities of the bushing tips and the apices of the cones of glass. The troughs are constructed to be adjustable in vertical position, depending upon the best results obtained, that is, stable drawing conditions with maximum yardage for a particular fiber size determines the exact vertical location with respect to the cones of glass. Liquid, such as water, is discharged at one side of the bushing into the troughs from a common header which serves to support the troughs and the liquid flows across the troughs with only its top surface exposed. The trough, because of the temperatures encountered near the cones of glass, is generally constructed of metal such as stainless steel and its surface finish protected by the liquid is substantially permanent. Equipment changes are materially reduced in number because of the protection offered the troughs by the liquid. The surface finish of the troughs may be reflective in which case more radiant energy will be absorbed by the liquid because of its passes through the liquid. If the surface is dull more radiant energy will be absorbed by the trough and then absorbed by conduction to the water.

Another form of support guide for the liquid film is a generally endless moving string, belt or fabric of a metallic or nonmetallic material. A support guide of this construction is passed between alternate rows of cones of glass in an arrangement similar to that described with respect to the trough. A liquid film covers at least portions of the surface areas of the supporting means. To utilize such a support guide, means are provided for moving the endless string or the like through a fixed path, such as between alternate rows of cones of glass and between the alternate rows at the sides of the bushing and also means for applying a liquid thereto. A trough or other container is provided flanking the bushing through which the endless carrier is passed, so as to insure a film of liquid covering the support-guide surface.

Still another form of liquid support guide is a plurality of stationary metal wires each supported at one end by a common header. The cooling fluid is discharged onto the wires from the header, so that a film covers all exposed wire surfaces. Complete coverage of the wires is important because if not protected by the film, the wires will lose their anneal and strength, and tend to distort and sag. This condition is undesirable because the heat transfer relationship is thereby changed. As in the trough embodiment first described, a major portion of the radiant energy emitted by the cones of glass is absorbed by the liquid film. Besides protecting the strength of the wires the liquid film also protects the surface finish of the wires. A matte finish, as produced by an acid etch, is desirable because of improved wetting of the wire by the liquid.

Other forms of support guides can be used without departing from the spirit of the invention. For example, a plurality of wires may replace each single wire or the support guides may be formed of a vitreous material capable of withstanding a temperature on the order of 2200° F. Quartz is one example of such material. The support guide may be porous, yet effectively support the liquid film in heat transfer relationship with the cones of glass.

In the preceding description the film has been referred to as being of a liquid such as water. In addition to water, liquids such as ethylene glycol and ethylene diamine can be used. However, water is the most practical liquid to use because it is readily available, cheap, does not contaminate the process and can be readily discharged without recovery and recirculating equipment. This may not be true for the other liquids named. In the following description, the liquid will be specifically identified as water, it being understood that this is not limiting but only explanatory.

To further describe the invention in detail, attention is directed to the appended drawings illustrating various embodiments of the invention in which like reference characters are used for the same part, and in which:

FIG. 6 is a view similar to that of FIG. 2 illustrating still another embodiment of the cone heat extractor of this invention in the preferred location with respect to the cones of glass and also illustrating the means for moving the heat extractor means through its predetermined fixed path;

FIG. 7 is a view taken on line 7—7 of FIG. 6;

FIG. 8 is a plan view of the embodiment illustrated in FIGS. 6 and 7;

FIGS. 10 and 11 are graphs similar to FIG. 9 for ethylene glycol and ethylene diamine, respectively.

Figure 1:
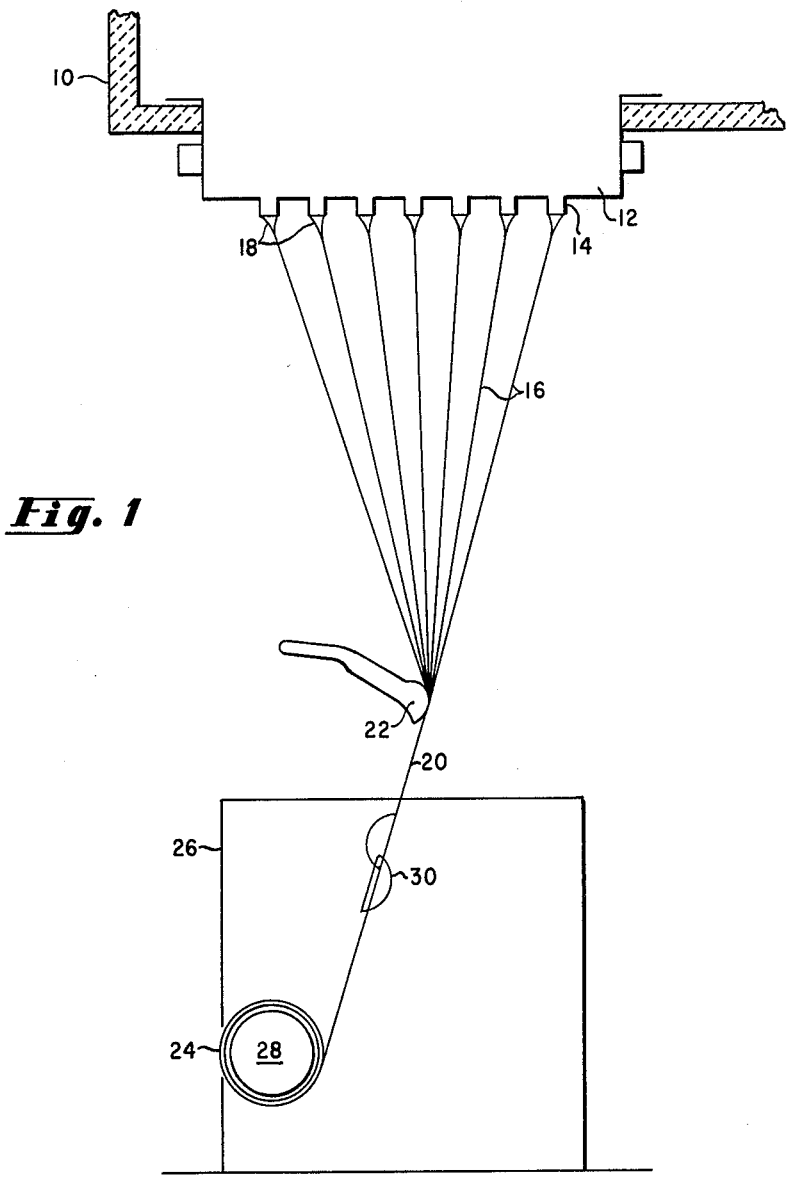
FIG. 1 is a side elevational view of a general arrangement of apparatus for the production of continuous glass fibers.

Referring now to the drawings, and particularly FIG. 1, there is illustrated a refractory furnace 10 in which glass is melted. The furnace 10 has an electrically heated feeder or bushing 12 associated therewith and the bushing 12 has a plurality of tips 14 at its lower extremity. There may be 100 or more tips, generally orderly arranged in rows extending from the bushing 12. A plurality of streams of glass flow from orifices in the bushing and its tips 14 for attenuation into fibers 16. The streams of glass neck-down and form cones 18 as they issue from the tips 14. The fibers 16 are gathered into a strand 20 by a gathering member or shoe 22. A sizing fluid is fed to the gathering surface of the shoe 22 and as the fibers pass thereover and are gathered into the strand, the size adheres to the fibers. The strand 20 thus formed of the gathered fibers is collected onto a forming tube 24 by a winder 26. The forming tube 24 is mounted on a rotating collet 28 and the strand is traversed onto the tube 24 by a traversing mechanism 30, as for example that shown and described in Beach United States Patent No. 2,391,870. Other gathering devices, size applying devices and traversing mechanisms can be used if desired. The winder 26 in the arrangement illustrated provides the attenuating force for the fibers, as is well understood.

Figure 2:
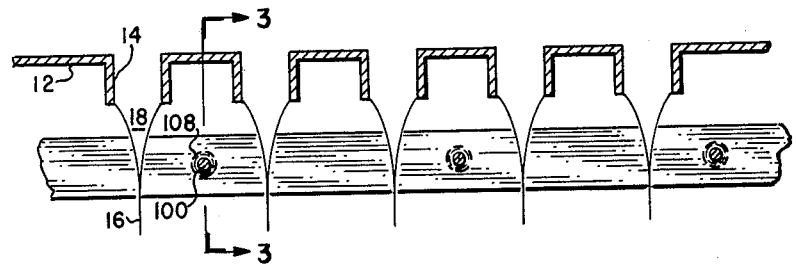
FIG. 2 is an enlarged view of a portion of a bushing showing the bushing tips, the cones of glass issuing from the bushing tips and illustrating a preferred embodiment of the cone heat extractor of this invention in the preferred location with respect to the cones of glass.
Figure 3:
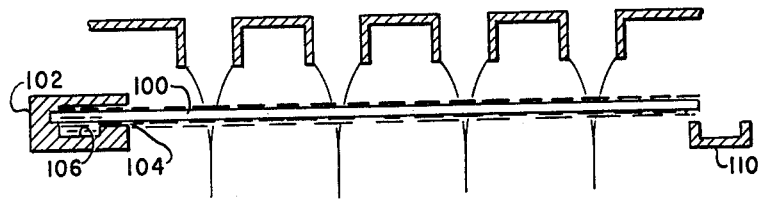
FIG. 3 is a view taken on line 3—3 of FIG. 2.

For a description of the preferred embodiment of the invention, attention is directed to FIGS. 2 and 3. Illustrated is a portion of a bushing 12, a plurality of bushing tips 14 arranged in orderly rows, and fibers 16 being attenuated from cones of glass 18 flowing from the tips 11. Wires 100 attached to a header 102 extending along a side of the bushing are supported so as to be positioned preferably mid-way between the apices of the cones 18 and the lower ends of the tips 14 and between alternate rows of cones 18. The wires extend from side-to-side of the bushing. The wires, of which there are many, pass through passages 104 and into suitable supporting apertures in the body of the header 102. The passages 104 open into a water supply conduit 106 in the header 102.

The supply conduit 106 is connected to a suitable source of water, such as a city water tap and in any accepted manner. The water discharges through the passages 104 and onto the wires so as to form a film 108 on the surface of each wire. A collecting trough 110 is provided along the side of the bushing opposite to the header 102. The trough 110 is arranged to collect the water flowing over the surfaces of the wires 100 and discharges the water in any suitable manner.

Water is supplied to the header 102 for discharge onto the wires at room temperature, i.e., as it discharges from a tap, at a rate of approximately one and one-half gallons (1½) per wire per hour. This rate of flow maintains the wires completely covered with a water film of approximately 0.2 mm. in thickness. The difference between inlet and outlet temperatures of the water is approximately 4° to 5° F.

The water films and their supporting wires are positioned to absorb energy radiated by the cones of glass. The practice of the invention contemplates changing the vertical position of the wires 100 with respect to the cones of glass 18 to obtain stability of fiber formation. The latter occurs when generally uniform diameter fibers are produced continuously without breakage and with a maximum output for the particular fiber diameter.

Figure 4:
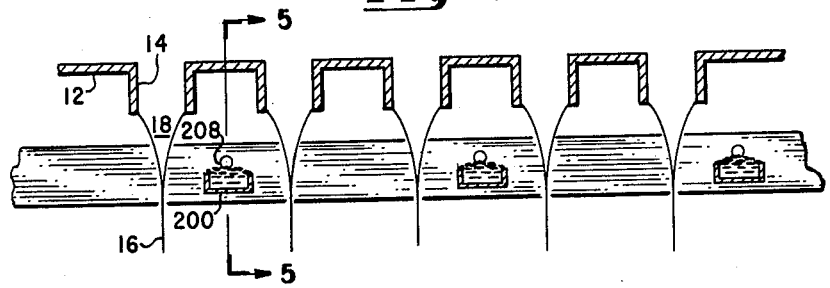
FIG. 4 is a view similar to that of FIG. 2 illustrating another embodiment of the cone heat extractor of this invention in the preferred location with respect to the cones of glass.
Figure 5:
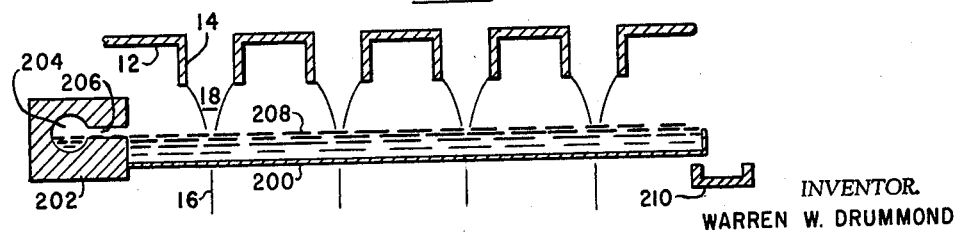
FIG. 5 is a view taken on line 5—5 of FIG. 4.

FIGS. 4 and 5 illustrate a second embodiment of the invention wherein troughs 200 attached to a header 202 are provided instead of the wires described above. The troughs 200 are placed between alternate rows of tips 14 and from side-to-side of the bushing in the same manner as described with respect to the wires 100. The troughs 200 have bottom portions and upstanding edge portions, the latter being on the order of 1/16 inch while the former are generally on the order of 1/8 inch. Water is supplied to the trough from a supply conduit 204 in the header 202 through passages 206 opening adjacent and above the trough 200. The water forms a film 208 on the top surface of the trough. A discharge water collecting trough 210 is provided opposite the header 202 for collection of the liquid flowing over the trough 200. The trough 210 discharges water at one of its ends in a suitable manner.

Water is supplied to the header 202 at approximately room temperature from a water tap and at the rate of 1½ gallons per trough per hour. The film produced in the trough is approximately 2 millimeters in thickness. The difference between inlet and discharge temperatures of the water during operation of the device is approximately 4 or 5° F. The troughs 200 are preferably positioned lower than the wires 100 with respect to the cones of glass 18. Their preferred location is adjacent the apices of the cones as illustrated in FIGS. 4 and 5. The water film 208 on the troughs are positioned to absorb energy radiated by the cones of glass. The vertical location of the troughs may be varied in the same manner and for the same purpose as the wires 100.

Turning now to FIGS. 6, 7 and 8, still another embodiment of the invention is illustrated. This invention includes an endless strand, string, belt, or the like 300 capable of moving through a predetermined fixed path and means for moving and guiding the endless member through the path. The endless strand, string, or belt, hereinafter referred to as an endless carrier 300, is made of fabric either metallic or nonmetallic. The passes of the endless carrier 300 are directed between alternate rows of glass cones preferably at the same level as the wires 100, previously described. The carrier is moved through a body of water 302 contained in the supply trough 304, so that a film of water 305 adheres to and covers the surfaces of the carrier. The water film on the carrier and the carrier itself are positioned to absorb radiant energy emitted by the cones of glass 18. The water film absorbs a major portion of the radiant energy as has been previously explained. To guide and drive the endless carrier through its predetermined fixed path, various pulleys, such as 306, 308 and 310 are provided; however, only one driven pulley need be provided for connection to a prime mover. The remaining pulleys are idler pulleys, driven by the endless carrier itself. As before, the practice of this invention contemplates adjusting the vertical location of the carrier to obtain the desired and optimum conditions of stability.

In the various embodiments illustrated and described, the water film maintains and protects the surface finish of the carrier over which it flows. For example, the water prevents oxidation and crusting of the smooth, bright, surface carrier. Thus, when the flow rate of the water is maintained at the same rate and the thickness of the film is constant, the carrier surface finish is maintained and the operating conditions will not vary by a time factor. Operating conditions can generally be predicted in advance. This is not possible with the prior art heat extracting members.

Figure 9:
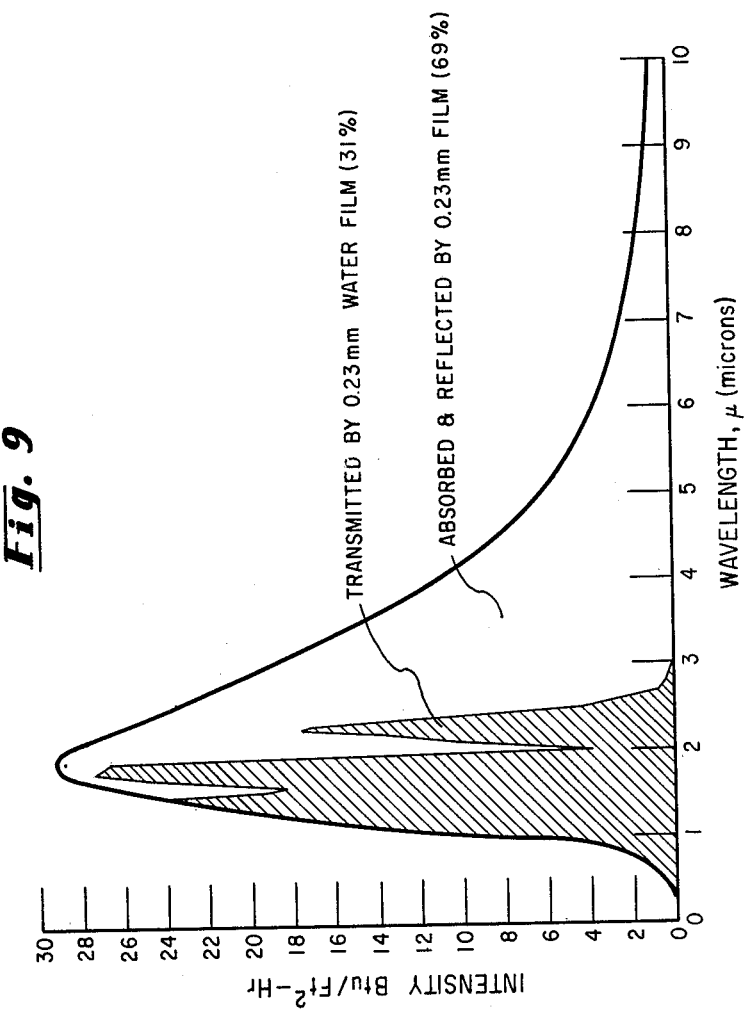
FIG. 9 is a graph of radiation intensity plotted against wavelength for a black body source at a temperature of 2200° F. showing by the identified areas under the curve the radiant energy absorbed and reflected, and transmitted by a 0.2 millimeter (0.0079 inch) thick film of water.

The water film described has a thickness in all of the embodiments discussed in excess of approximately 0.2 millimeter (0.0079 inch). A water film of this thickness absorbs and reflects approximately 69 percent of the radiant energy emitted by the cones of glass at the temperature encountered, approximately 2200° F. FIG. 9 is a graph plotted intensity of radiation in B.t.u. per foot square per hour versus wavelength in microns for a film of water 0.2 millimeter in thickness. The entire area under the curve represents the amount of energy radiated or emitted by a black body at 2200° F., the approximate temperature encountered adjacent the cones of glass 18. The shaded area, a portion of the area under the curve, represents the amount of energy transmitted through the 0.2 millimeter film of water. The unshaded remainder therefore represents the amount of energy absorbed and reflected by the film of water of 0.2 millimeter in thickness. From this graph and subtracting the shaded area from the entire area of the curve, a 0.2 millimeter film of water absorbs and reflects approximately 69 percent of the total radiant energy and is transparent to approximately 31 percent of the total radiant energy. The quantity of energy reflected by the water film of 0.2 millimeter thickness is on the order of 5 percent to 10 percent of the energy reaching the surface, so that the film of water actually absorbs 59 percent to 64 percent of the total radiant energy.

However, because of the nature of the support and the water moving thereover, it is thought that at least a portion and probably a major portion of the energy transmitted through the water film is absorbed by the support and then transferred, by conduction, to the water film. It is felt that at least 90 percent of the radiant energy is thus carried away by the water film. Unfortunately, it is difficult to measure exactly the percentages of heat transfer occurring in the system of this invention.

FIGS. 10 and 11 show that an ethylene glycol film of .02 millimeter in thickness transmits 41 percent of the radiant energy in the wavelength of ½ to 10 microns reaching its surface and that an ethylene diamine film of the same thickness transmits 37.1 percent of the radiant energy of ½ to 10 microns wavelength reaching its surface. The amounts of energy absorbed and reflected are thus similar to the water film of the same thickness.

As an example of the heat extracting means of this invention and referring specifically to the preferred embodiment, a number of stainless steel wires of number 17 gauge have been successfully used in the manner described. These wires have an outside diameter of 0.067 inch and were inserted into and secured centrally of a water discharge opening in a header of number 13 gauge or 0.083 inch in diameter. The total dimension of the support guide, that is, the wire, and the water film thus supported were limited to the overall dimension of the water discharge opening. The film and wire combined dimension did not exceed the diameter of the discharge opening. Thus, the film of water was approximately 0.008 inch in thickness. This thickness corresponds to the 0.2 millimeter film for the curve forming FIG. 9 of the drawing. The wires, prior to their use, were acid etched so as to have matte finished surfaces. This finish ensured complete wetting by the water and thus assured a water film completely covering the surface of the wires. The film of water protects the wires from loss of anneal, strength, and against deterioration because of the heat encountered in their use. Water was flowed over the surfaces of the wires at a rate of 1½ gallons per hour from a city supply tap so that the water was approximately at room temperature. Measurements of the water supply and the water discharge were made and a 4° to 5° F. rise in temperature of the water was noticed. Any rise in temperature of the wire could not be measured because of shorting-out of the thermocouple by the water film.

While the invention has been described with reference to certain embodiments, it is to be understood that it is truly illustrated and that other heat extracting arrangements coming within the scope of the appended claims could be employed without departing from the spirit of the invention.

I claim:

1. In apparatus for producing glass fibers from a body of molten glass which includes a heated bushing having orifices therein through which glass passes and forms cones of glass and means for drawing fibers from the glass passing through the orifices, said orifices being arranged in orderly rows from side-to-side of the bushing, the improvement which comprises supply means for a liquid, and means for guiding and supporting said liquid with a surface of the liquid exposed to the cones of glass and from side-to-side with respect to and spaced from the bushing, said guiding and supporting means being positioned and extending between rows of orifices of the bushing.

2. Apparatus as recited in claim 1 in which the guiding and supporting means comprises a plurality of spaced wires positioned between rows of orifices and from side-to-side of the bushing.

3. Apparatus as recited in claim 2 wherein the wires are endless and means are provided for moving said wires through a predetermined fixed path between the rows of orifices.

4. Apparatus as recited in claim 1 in which the supporting and guiding means comprises a plurality of troughs arranged between alternate rows of orifices and from side-to-side of the bushing.

References Cited in the file of this patent

UNITED STATES PATENTS

| | | |
|---|---|---|
| 353,291 | Denton | Nov. 30, 1886 |
| 1,622,131 | Crispin | Mar. 22, 1927 |
| 1,771,232 | Paysee | July 22, 1930 |
| 2,908,036 | Russell | Oct. 13, 1959 |
| 3,068,670 | Russell | Dec. 18, 1962 |
| 3,074,256 | Whitehurst et al. | Jan. 22, 1963 |